United States Patent [19]

Matyas et al.

[11] 4,206,315

[45] Jun. 3, 1980

[54] DIGITAL SIGNATURE SYSTEM AND APPARATUS

[75] Inventors: Stephen M. Matyas, Poughkeepsie; Carl H. W. Meyer, Kingston; Walter L. Tuchman, Woodstock, all of N.Y.

[73] Assignee: International Business Machines Corp., Armonk, N.Y.

[21] Appl. No.: 866,871

[22] Filed: Jan. 4, 1978

[51] Int. Cl.$^2$ .............................................. H04L 9/00
[52] U.S. Cl. ................................... 178/22; 340/149 R
[58] Field of Search ........................ 178/22; 340/149 R

[56] References Cited

U.S. PATENT DOCUMENTS

| | | | |
|---|---|---|---|
| 3,790,957 | 2/1974 | Dukes et al. | 340/149 R |
| 3,996,449 | 12/1976 | Attanasio et al. | 340/149 R |

OTHER PUBLICATIONS

"New Directions in Cryptography," Diffie et al., *IEEE Transactions on Information Theory*, IT-22, No. 6, 1976, pp. 644–654.

"Digital Signature for Identifying Message and Sender," *IBM Technical Disclosure Bulletin*, Matyas, Disclosure P08-76-0407.

*Primary Examiner*—Howard A. Birmiel
*Attorney, Agent, or Firm*—W. S. Robertson

[57] ABSTRACT

A digital signature machine provides a simplified method of forming and verifying a signature that is appended to a digital message. A sender transmits a signature with the usual signature keys and with validation table entries that correspond to the unsent keys and with the compressed encoding of the next validation table. The receiver uses the compressed encoding of the next validation table to form validation table entries from the signature keys so that the receiver has a full validation table. This validation table is compressed and compared with the compressed encoding which was received from the sender in a preceding message.

6 Claims, 8 Drawing Figures

SIGNATURE KEY TABLE
FOR MESSAGE $M_i$ TO RECEIVER B

| COMPRESSED MESSAGE BIT POSITION | KEY FOR 0 BIT | KEY FOR 1 BIT |
|---|---|---|
| 1 | $k^i_1$ | $K^i_1$ |
| 2 | $k^i_2$ | $K^i_2$ |
| 3 | $k^i_3$ | |
| ⋮ | | |
| 64 | $k^i_{64}$ | $K^i_{64}$ |

FIG. 1

SIGNATURE KEY TABLE
FOR MESSAGE $M_i$ TO RECEIVER B

| COMPRESSED MESSAGE BIT POSITION | KEY FOR 0 BIT | KEY FOR 1 BIT |
|---|---|---|
| 1 | $k_1^i$ | $K_1^i$ |
| 2 | $k_2^i$ | $K_2^i$ |
| 3 | $k_3^i$ | |
| ⋮ | | |
| 64 | $k_{64}^i$ | $K_{64}^i$ |

FIG. 2

VALIDATION TABLE $VT^i$
FOR MESSAGE $M_i$ TO RECEIVER A

| COMPRESSED MESSAGE BIT POSITION | ENTRY FOR 0 BIT | ENTRY FOR 1 BIT |
|---|---|---|
| 1 | $v_1^i$ | $V_1^i$ |
| 2 | $v_2^i$ | |
| ⋮ | | |
| 64 | $v_{64}^i$ | $V_{64}^i$ |

DIGITAL SIGNATURE SYSTEM AND APPARATUS

INTRODUCTION

The following definitions and explanations of the notation that will be used in this specification are presented in a sequence that will provide a helpful background to understanding this invention.

A message is transmitted from a sender to a receiver. A particular message will be designated $M_i$, where i is the order of the message in a sequence of messages. Some of the operations of the apparatus of this invention are performed for a fixed number of messages and this number is designated n. The message may be encrypted if desired, but it will be helpful to think of the message as being transmitted in clear text to avoid possible confusion with other coding and ciphering operations that are performed.

A digital signature is a bit pattern that is appended to a message to identify the sender of a particular message. For example if the sender is a bank customer and the receiver is the bank and the message is an order to the bank to transfer funds from the sender to another, the signature would prove that the message in fact originated from the sender and that the message prepared by the bank customer was in fact the message received by the bank.

An opponent is a person who might attempt to submit an altered or forged message and signature. Many of the objects and advantages of the invention can be understood by considering how either an opponent or a receiver might attack the system or how a sender might later attempt to disavow a valid message. The signature system uses cryptographic techniques and other traditional security techniques to thwart attack.

A signature machine is a combination of a cryptographic engine and other storage and logic components that is used by a sender to form a signature and is used by a receiver to validate a signature. A signature machine is used in conjunction with conventional communications and data processing equipment.

Message compression is a technique for reducing a message of arbitrary length to a fixed size of relatively short length that can be handled cryptographically. Although the compressed message can be any preselected length, it will be helpful to use a specific example of a 64 bit compressed message. This 64 bit word will be called the compressed encoding of a message $M_i$ and will be represented symbolically as $CE(M_i)$. Cryptographic techniques are used so that a change of any bit or combination of bits in a message will with high probability result in a different compressed encoding. Thus, an opponent who has intercepted a message can not reconstruct a new message that has the same compressed encoding as the intercepted message.

Cryptographic signature keys form part of the signature. Before transmitting a message, the sender prepares an array of 128 secret cryptographic keys. The array will be called a signature key table. A signature key table is used only once, for one particular message. In the signature key table there are two keys for each bit of the 64 bit compressed encoded message. The two keys will be designated $k_j{}^i$ and $K_j{}^i$ where i is the sequence number of the message and j is the bit position of the corresponding bit in the compressed encoding of the message. One or the other of the keys of each pair is put into the signature according to whether the corresponding bit in the compressed encoding of the message is a 0 or a 1 bit. A key k is used to encode a 0 bit and a key K is used to encode a 1 bit. Thus, the signature contains 64 selected keys of 56 bits each for a total of 3584 bits. In other words, in this part of the protocol the keys are not used in their conventional sense for the protection of data through encryption, but instead they are used as a direct substitution code for representing the 64 bits of the compressed encoded message. The receiver uses these received keys to verify the compressed encoded message.

A master key is used to form the signature keys by enciphering a sequence or list of non-secret words under the master key. The master key is kept secret and techniques are available in case of a dispute between a sender and a receiver for verifying a master key without actually revealing it.

A validation table permits the receiver to verify the signature keys that are sent with the signature. A sender prepares a validation table by enciphering a non-secret word under each of the signature keys. In this operation a signature key is used as an ordinary cryptographic key. Thus, the validation table has a validation table entry for each signature key in the signature key table. The validation table entries are designated $v_j{}^i$ and $V_j{}^i$, where i and j have the same significance as in the symbols for the keys and v and V correspond to k and K respectively. Because the validation table entries are enciphered quantities, the validation table and the word that is enciphered under the signature keys to form the validation table can be sent to the receiver ahead of an actual message without compromising the security of the signature system. The validation tables themselves must be validated by the receiver prior to the commencement of signed messages. This could be accomplished by requiring the sender to record, in a designated registry, the validation tables or other appropriate information that would then allow the receiver to validate the received validation tables. The non-secret word could be defined as part of an agreed upon protocol between the sender and receiver.

When the receiver receives a message with a signature, the signature keys in the message are again used to encipher the non-secret word to produce a second set of validation table entries. In the conventional system being described, if the validation table entries which are formed by the receiver equal the corresponding entries in the original validation table which was prepared by the sender, the signature and the message can be accepted as authentic. [A different use of the validation table will be described later.]

SUMMARY OF THE INVENTION

The conventional signature system that has been described so far is highly secure, but there are many applications where a theoretically lower value of security would be entirely adequate. A general object of this invention is to provide a signature system that is significantly simplified in comparison with the signature system just described but which maintains generally comparable security. A more specific object is to provide a signature system in which it is not necessary to transmit a full validation table to a prospective receiver before each message is sent.

In the signature system of this invention, the signature keys are formed in the general way that has already been described. The method and apparatus for verifying these keys is new and is significantly simplified. The sender initially forms signature key tables and validation tables for a selected number of future messages that are to be sent to a particular receiver. The signature key tables are formed according to a numerical sequence so that the signature key tables can be reconstructed if required by repeating the process of forming the keys instead of maintaining the keys in storage, as is required if the keys are formed at random. For example, the signature keys can be formed by enciphering a sequence of counter values under the master key.

A validation table is formed by enciphering, under the corresponding signature key, the compressed encoding of the next validation table. For this operation, a sequence of signature tables is first formed and the validation tables are prepared by operating on the signature tables in their reverse order. The last signature table of the sequence is used to encipher an arbitrarily selected word, such as sixty-four zero bits, to form the last validation table. The last validation table is then compressed to sixty-four bits and this sixty-four bit compressed encoding is used to form the validation table for the next to the last signature table.

The sender initially sends the receiver the compressed encoding of the first validation table and tells the receiver the number of messages that can be sent with the sequence of signature key tables and validation tables that have been prepared. As is conventional in the protocol for a signature system, a designated registry holds the information for independently verifying these values. The signature for the first message includes the signature keys in the form already described, the validation table entries for the keys that are not sent as part of the signature, and the compressed encoding of the next validation table. The receiver uses the keys in the signature to encipher the compressed encoding of the validation table, which was previously sent to the receiver as already explained. The result of this enciphering operation forms the validation table entries that were not sent in the signature. With the sixty-four validation table entries included in the signature and the sixty-four validation table entries formed from the signature keys, the receiver has a complete validation table. This validation table is compressed to sixty-four bits and it is compared with the sixty-four bit compressed encoding of the validation table that was previously sent to the receiver. If the two compressed encodings compare equal, the message and signature can be accepted as authentic.

Other objects and features of the invention can be understood from the following description of a preferred embodiment of the invention.

THE SIGNATURE MACHINE OF THE DRAWING

Figure 1:
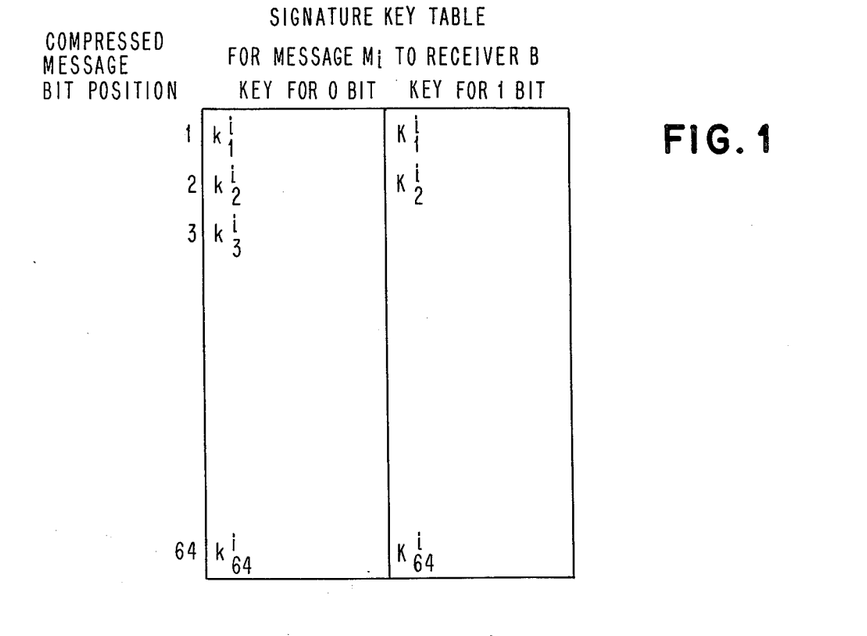
FIG. 1 is a diagram representing a table of signature keys for forming the signature of one message.
Figure 2:
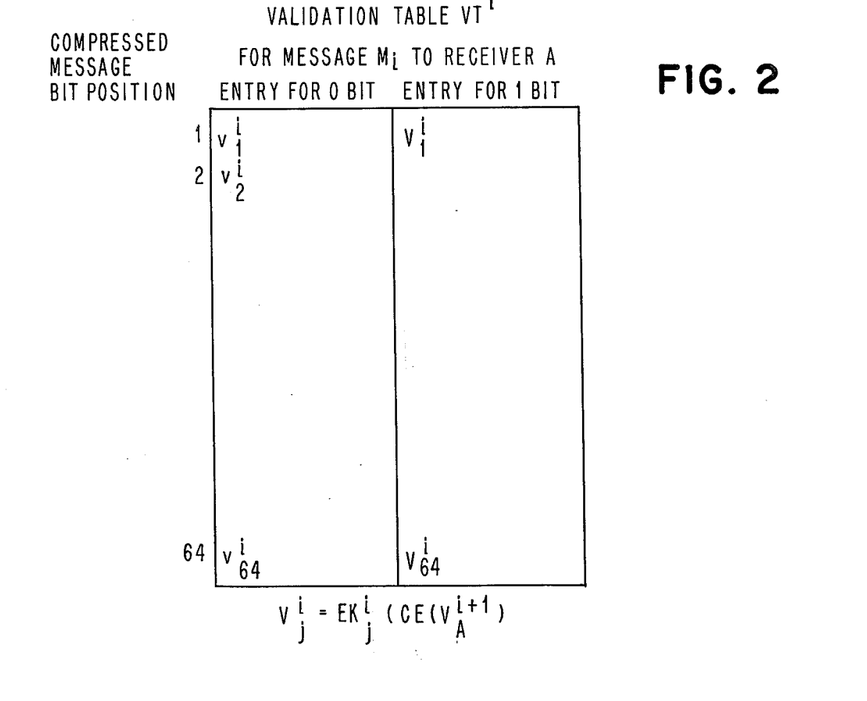
FIG. 2 is a diagram of a validation table associated with the signature key table of FIG. 2.

The Signature Table And Validation Table—FIGS. 1 and 2

The signature key table of FIG. 1 has 128 entries of 64 bits each and the table can be thought of as having the two dimensional structure of FIG. 1. The table has 64 rows numbered 1 thru 64 corresponding to the 64 bits of the compressed encoding of the message for which the signature is to be formed. The table has two columns, one containing signature keys that are to be used for encoding a zero bit in the compressed message and one containing signature keys that are to be used for encoding a one bit in the compressed message. The zero keys are designated $k_1^i$ through $k_{64}^i$ and the one keys are designated $K_1^i$ through $K_{64}^i$. For each bit in the compressed message, one or the other of the two signature keys in the corresponding row, $k_j^i$ or $K_j^i$, is transmitted as part of the signature to encode the $j^{th}$ bit of the compressed encoding of $M_i$.

The validation table of FIG. 2 is similar in structure to the signature key table of FIG. 1. A validation table entry is formed by using the corresponding key in the signature key table to encode a predetermined parameter. In the signature machine of this invention the parameter is the compressed encoding of the next validation pattern, $VT^{i+1}$. The validation table entries are designated $v_1^i$ through $v_{64}^i$ and $V_1^i$ through $V_{64}^i$ so that corresponding signature keys and validation table entries have the same subscript and superscripts and lower case k and v correspond to a zero bit in the compressed encoding of a message and upper case K and V correspond to a one bit.

For some applications of this invention, it will be desirable to generate and store the tables in the form that is shown in FIGS. 1 and 2. It will ordinarily be desirable to generate these entries only as they are needed and not to store an entire table. However, it will be helpful to think of the tables as having the form of FIGS. 1 and 2 regardless of their actual form.

A key table must be kept secure until it is used to form a signature. A validation table does not have to be kept secure because the complexity of the standard encrypting algorithm makes it impossible to find a signature key from an entry in the validation table. However the validation table must be secure against substitution of a different validation table by an opponent.

Figure 3:
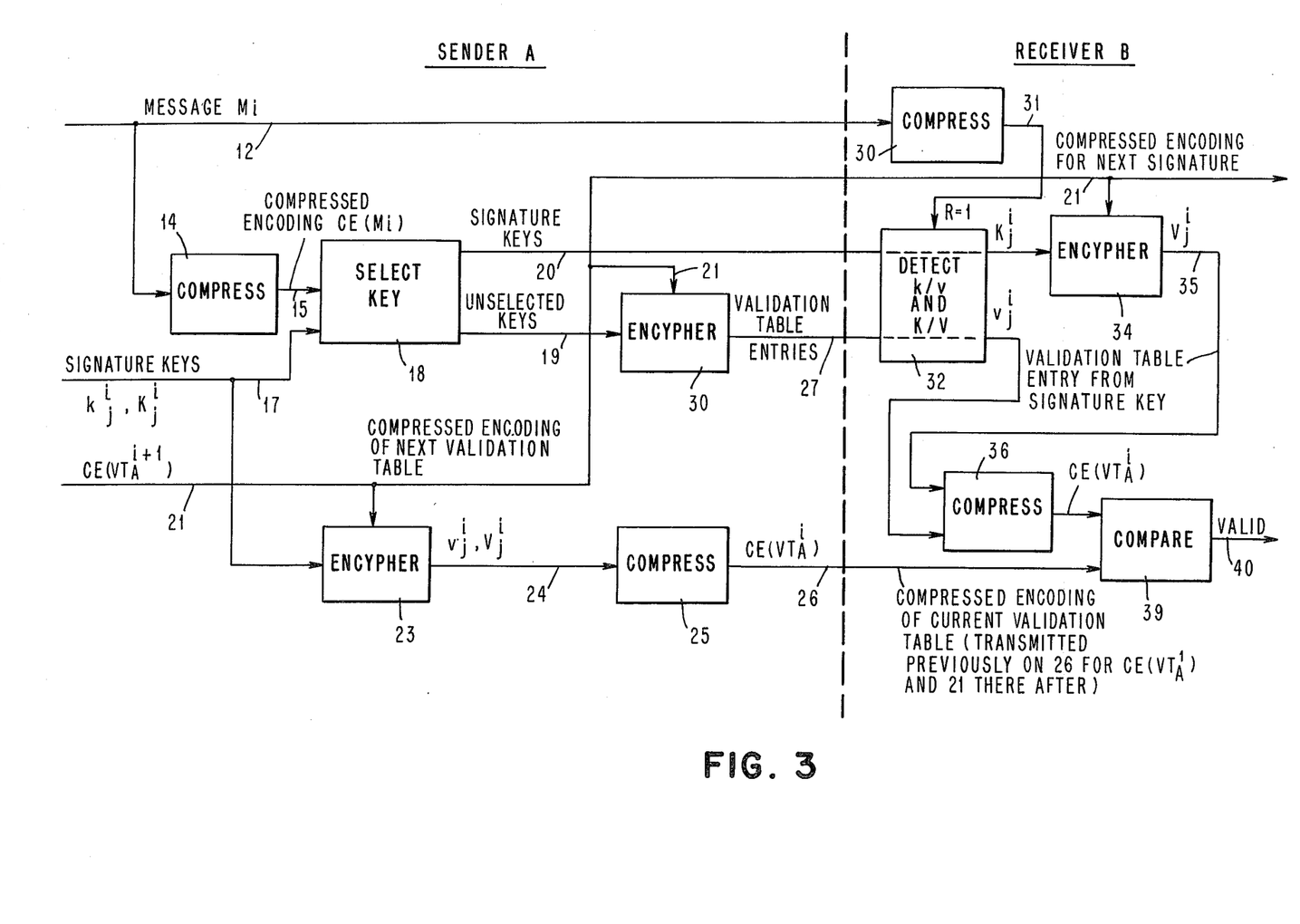
FIG. 3 is a diagram showing the flow of signature keys and other information in an operation of the signature machine of this invention.

Introduction—FIG. 3

It will be helpful to consider first the flow of the message and the signature from the sender to the receiver and the general operations that are performed in this flow and to later consider the components that produce these operations and some additional operations and associated components. In FIG. 3 a dashed vertical line separates the operation of a sender A on the left from the operations of a receiver B on the right.

The sender uses conventional communications equipment to generate a digital message $M_i$ and to transmit the message to the receiver as represented by a line 12. The sender also compresses the message in an operation represented by block 14 and forms a 64 bit compressed message designated $CE(M_i)$ shown on a line 15. The table of 128 cryptographic keys (as shown in FIG. 1) is supplied on a line 17 in the sequence $k_1^i$, $K_1^i$, $k_2^i$, $K_2^i$ . . . $k_{64}^i$, $K_{64}^i$, and in an operation of block 18, sixty-four of the keys are selected according to the binary value of the corresponding bit of the compressed message on line 15 to form part of the signature and are shown on a line 20. The other keys remain unselected and are shown on a line 19. Except for the selection of the word on line 21 that is to be enciphered, the operations and components of the system that have been described so far are conventional in the system described in the section of this specification entitled Introduction.

In a preliminary operation, the sender has used the keys on line 17 and the word on line 21 in an operation shown in block 23 to form a validation table which is shown on line 24 with representative entries $v_j^i$ and $V_j^i$. This table is compressed to sixty-four bits in the operation of block 25. The compressed encoding of the next validation table is supplied to the receiver ahead of the associated message. The compressed encoding of the first validation table in a block is transmitted to the receiver in any secure way as is represented in FIG. 3 by line 26. Thereafter, the compressed encoding for the next validation table, $VT^{i+1}$ is transmitted to the receiver with the signature for current message, $M_i$, as represented by line 21.

The sender also transmits to the receiver on a line 27 the 64 entries of the validation table that correspond to the unselected keys. Preferably these validation entries are formed in the separate operation of block 30, but equivalently the identical entries from the validation table on line 24 can be used.

Figure 7:
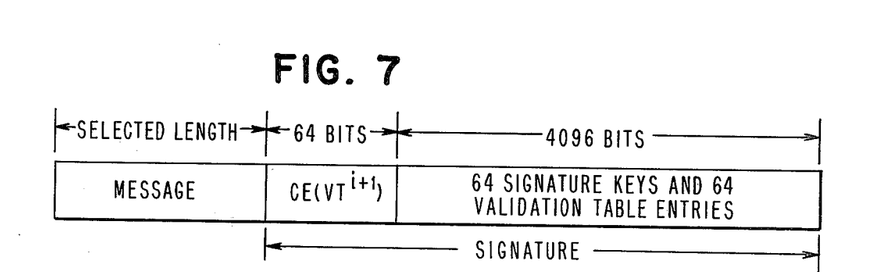
FIG. 7 is a diagram representing a message and a signature formed of validation table entries and signature keys.

Conventional communications equipment combines the message on a line 12, the selected keys on line 20 and the validation table entries on line 27 and the compressed encoding of the validation table for the next message, $CE(VT^{i+1})$ on line 21; and it supplies them in a sequential format on a common communications channel to the sender. The signature keys and the validation table entries may be transmitted in any systematic sequence, for example as 64 signature keys followed by 64 validation table entries. FIG. 7 is an example of a suitable format. Preferably the signature key and the validation table entry for a particular bit of the compressed message are transmitted as a sequential pair. For example if bit number five of the compressed message on line 15 is a zero, the communications channel represented by lines 12, 20, 21 and 27 carries the sequence $k_5^i$, $V_5^i$ and if this bit in the compressed message is a one, the sequence of the pair is $v_5^i$, $K_5^i$.

The receiver compresses the message on line 12 in an operation represented by block 30 to produce a 64 bit compressed message on a line 31 that corresponds to the compressed message on line 15 of the sending station. In an operation represented by block 32, the bit values of the compressed message are used to identify components of the signature as a signature key or as a validation table entry, corresponding to the separation of the signature keys and validation table entries represented by lines 20 and 27. In an operation represented by a block 34, the signature keys on line 20 are used to encipher the selected word on line 21 to form the missing validation table entries on a line 35. The word on line 21 is available for validating the next signature. In an operation represented by a block 36, the validation table entries that were transmitted to the receiver as part of the signature on line 27 and the complementary validation table entries on line 35 that were constructed by the receiver from the signature keys on line 20 are compressed to form the compressed encoding of the validation table on a line 37. As a block 39 represents, the compressed validation table that is formed by the sender on line 37 is compared with the compressed encoding of the same validation table that was previously supplied to the receiver on line 26 or line 21. The signal on line 40 signifies that the signature is valid or that an invalid signature has been detected.

Figure 4:
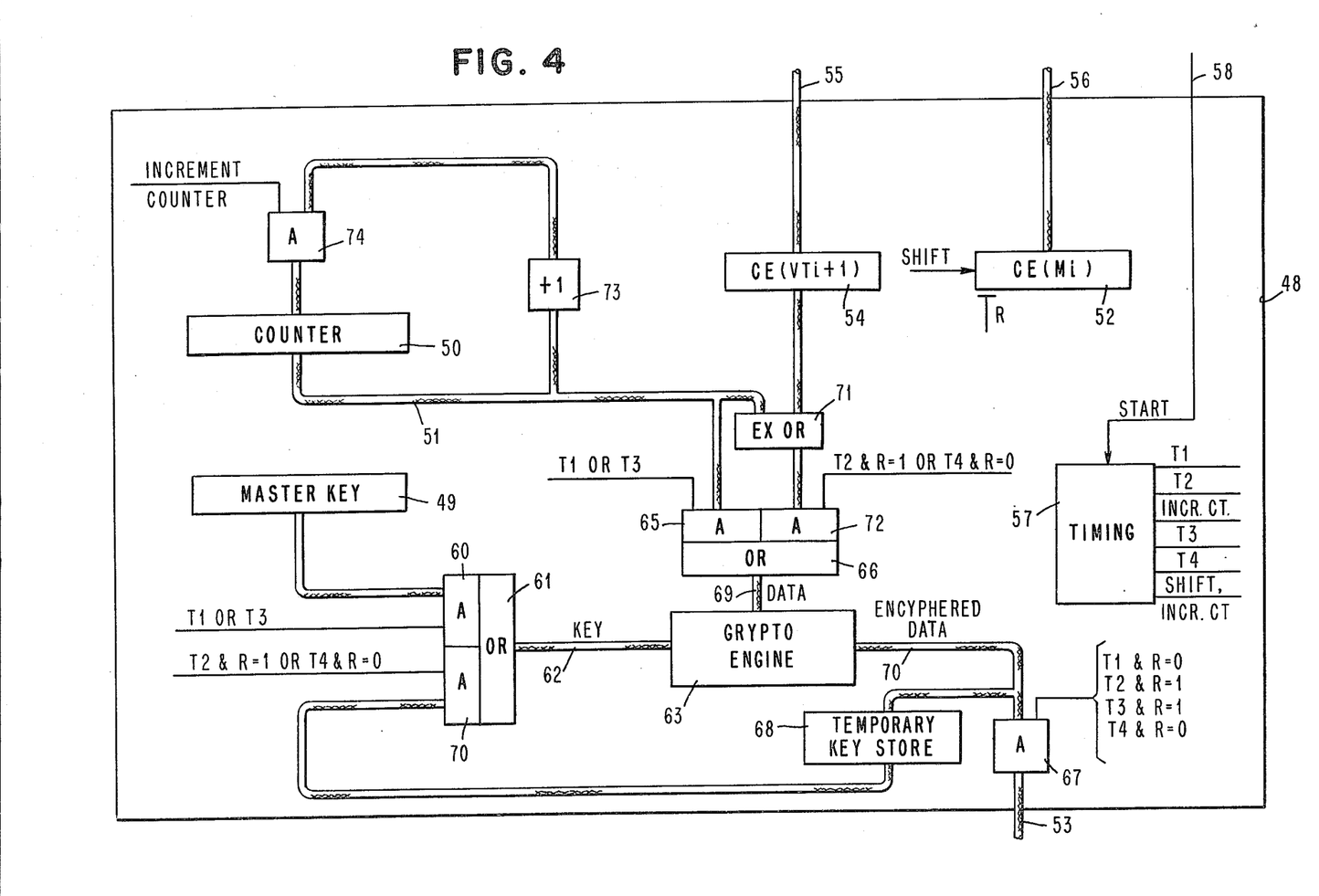
FIG. 4 is a diagram of the preferred signature machine, showing only the components that operate to form a signature that is to be transmitted with a message from a sender to a receiver.

The Signature Forming Components—FIG. 4

The components of the signature machine are located in an enclosure 48 that is secure against unauthorized access to the components or to the data or programs that are held by the components. The enclosure may also hold other components for convenience of electronic packaging. Techniques for maintaining such security are well known. For example the enclosure may be locked by a physical key that is required for access to some of the data storage devices in the signature machine.

The signature machine is adapted to be used by a number of users who each may communicate with a number of receivers. Each user has a master key that is held in a register 49 during a signature forming operation of the user. Normally a user uses a single master key for all signature forming operations, but the master key is changed from time to time and different master keys can be used for messages to different receivers. A counter register 50 holds a count value that appears on a bus 51 and is used during a signature forming operation. When one signature has been formed, the count value is saved to be used to begin the next signature forming operation. Each sender keeps a separate count value for each intended receiver. Registers 49 and 50 are in a non-volatile storage technology so that their contents will not be lost if power is interrupted.

The master key and appropriate count values are saved so that a signature that is challenged by either the sender or the receiver can be tested by use of the master key and the counter values. (A new master key is created when the old master key is revealed). A suitable data store in a non-volatile technology is provided in enclosure 48 to store the master keys of the various senders and the counter values for the various combinations of senders and receivers. Stores of this kind are well known and the techniques for transferring an addressed word from the store to registers 49 and 50 and for assuring that such transfers are made only by authorized persons are well known and these conventional components are not shown in FIG. 4.

A cryptography engine 63 conventionally operates with data entries of sixty-four bits and with keys of fifty-six bits and produces a sixty-four bit output. The fifty-six bit key can be in the form of a unit of fifty-six bits or in the form of a word of sixty-four bits with fifty-six cryptographically significant bits and eight bits that are used for parity or for padding. It will simplify the explanation to usually refer to the keys in the sixty-four bit form. The explanation also applies to a cryptographic engine in which the keys have sixty-four cryptographically significant bits.

The other components of FIG. 4 will be introduced as they appear in the description of an operation to form a sixty-four bit (or fifty-six bit) signature key or validation table entry on a bus 53 in response to a corresponding bit, designated R, of a sixty-four bit compressed message that the user loads into a register 52 from a bus 51. A timing circuit 57 supplies a sequence of timing pulses T1, T2, T3 and T4 and the signature forming operation will be described as it takes place at each of these successive times. Suitable timing circuits are well known. To simplify the drawing, the connections from timing circuit 57 to gates and from the one bit output of register 52 are indicated by legends on input lines to the gates. The logic functions of the legends are formed by conventional combinatorial logic circuits as specified by the legends. The timing circuit is preferably started and the other components are enabled by a control signal that is supplied by the user on a line 58.

At time T1, the circuit of FIG. 4 generates the sixty-four bit signature key for a zero key, $k_j^i$, in the signature key table. A set of sixty-four AND gates and sixty-four OR gates 60 and 61 respond to the timing signal T1 to transmit the master key to the key input 62 of a cryptography engine 63. Gates 65 and 66 respond to timing signal T1 to transmit the value of counter 50 to the data input 69 of cryptography engine 63 and it produces a signature key at its output 70. If the corresponding bit, R, of the compressed message in register 52 is a zero, this signature key is to become part of the signature, and a gate 67 responds to a signal T1 AND R=0 to transmit the signature key to bus 53. If R=1 at time T=1, the corresponding validation table entry $v_j^i$ is to be included in the signature instead of key $k_j^i$. A register 68 or other suitable means is provided for holding the key $k_j^i$ for the operation of forming validation table entry $v_j^i$ at time T2.

A circuit 71 forms the bit for bit Exclusive-OR operation on the count in counter 50 and the compressed encoding of the next validation pattern which the user loads into a register 54 from a sixty-four bit bus 55. (The compressed encodings of the validation tables may be kept in the non-volatile storage inside enclosure 48, but it is not necessary in order to maintain the security of the validation tables.) Circuit 71 provides additional complexity and corresponding added security to the signature system but it is not required. From a more general standpoint, a validation table entry is formed by enciphering a function of the compressed encoding of the next validation pattern, and the preceding description in which this function is the compressed encoding itself, this function corresponds to maintaining sixty-four zero bits at the counter input to circuit 71.

A gate 72 and gate 66 respond to control signals T2 AND R=1 to transmit the function of the compressed encoding of the next validation pattern at the output of circuit 71 to the data input of cryptography engine 63. A gate 70 and gate 61 respond to the same signals T2 AND R=1 to transmit the key in register 68 to the key input of the cryptography engine. Gate 67 responds to signals T2 AND R=1 to transmit the validation table entry $v_j^i$ to bus 53.

At the end of this operation and before the operation of time T3, the timing circuit produces a signal to increment the counter. A plus one adder 73 provides the incremented value and a gate 74 reloads the counter with the new value. Various circuits for this function are well known. Equivalently counter 50 and the associated components can provide a systematic sequence of sixty-four bit values that are not in a normal counting sequence.

At time T3 the circuit operates with the master key and the counter value in the way already described for time T1 to form a one key $K_j^i$. If R=1, this key is loaded onto bus 53. If it is a zero, a validation table entry $V_j^i$ is formed at time T4 and loaded onto bus 53. At the end of this operation, signals from timing circuit 57 increment counter 50 in the way already described and also shift register 52 to produce the next bit, R+1, of the compressed encoding at the output of the register.

The circuit may be provided with a counter (not shown) to signal the end of the operation on sixty-four bits of register 52 or equivalently this counting function can be provided by general purpose processing circuits that operate under programs of a user to supply the control signals mentioned earlier for forming a signature of a preselected length.

Figure 8:
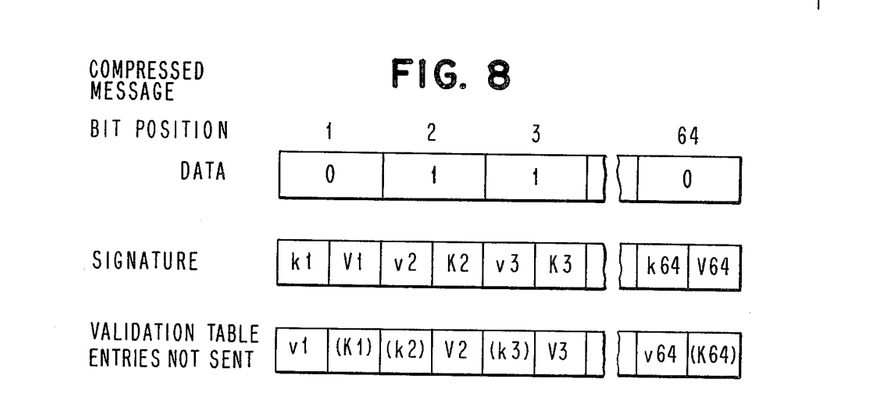
FIG. 8 is a diagram showing an example of a compressed encoding of a message and the particular keys and validation table entries that form the signature and also the validation table entries that are not sent with the message.

An Example—FIG. 8

FIG. 8 shows an example for a sixty-four bit compressed message having the bit sequence 011 ... 0. FIG. 8 also shows the signature key or the validation table entry that is transmitted to the receiver for each of the four representative bits of the compressed message. The key or validation table entry that is not sent to the sender is also shown in FIG. 8. Thus, FIG. 8 shows the entire signature key table and the entire validation table for the message. The receiver directly receives the half of the validation table in the line labeled "Signature" and uses the keys in this line to construct the missing half of the validation table that is shown in the line labeled "Validation Table Entries Not Sent." In this example, bit 1 of the compressed message is a 0 bit and the signature contains key $k_1$ and validation table entry $V_1$. The receiver does not receive validation table entry $v_1$ but in the operation that will be described next the sender uses the key $k_1$ and other information of a valid message to construct the missing validation table entry, $v_1$. The keys that are not sent as part of the signature are not used in this operation and are shown in parentheses in FIG. 8.

Figure 5:
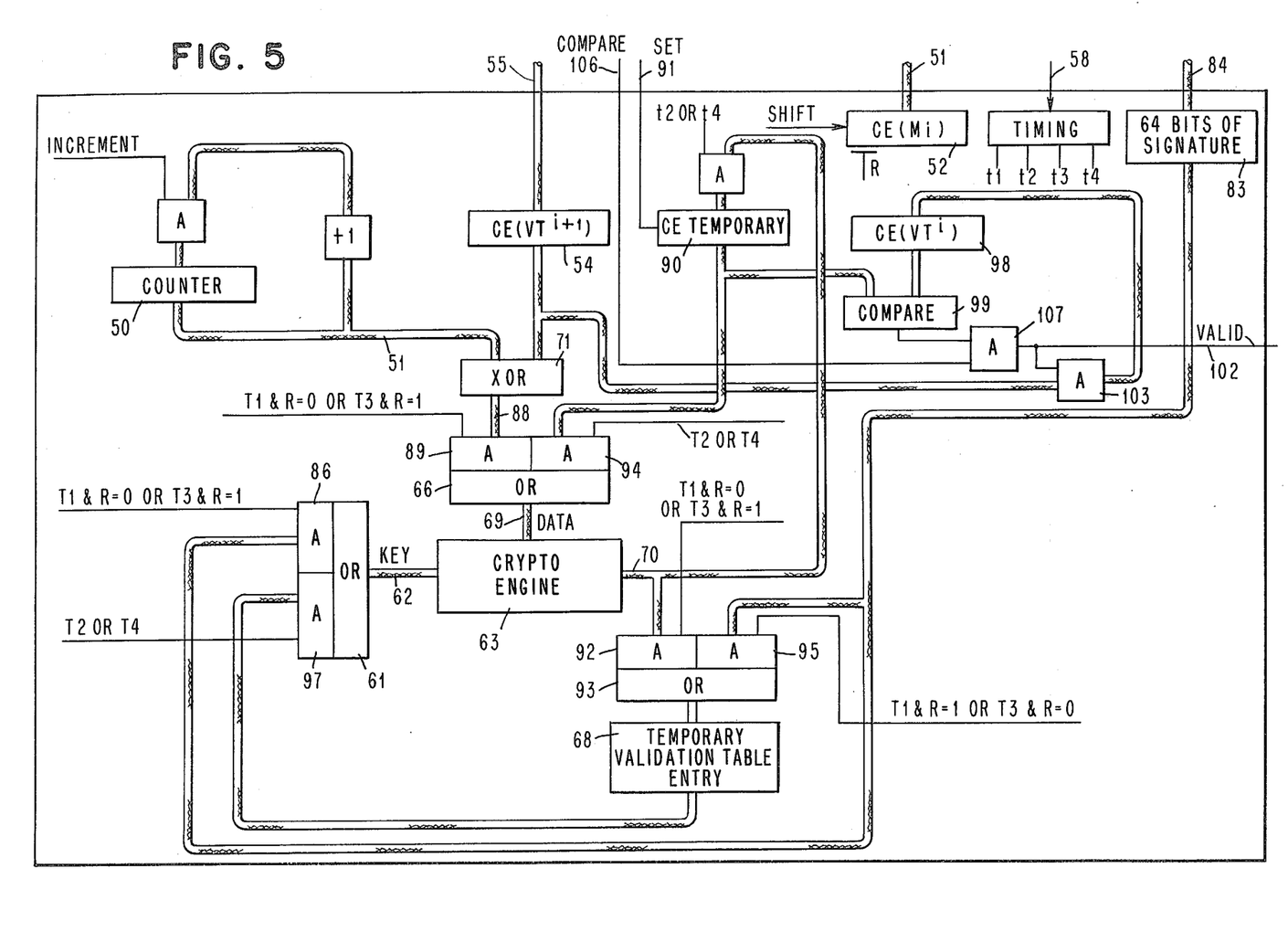
FIG. 5 is a diagram of the signature machine of this invention showing only the components that operate to validate a message and signature that has been received by a receiver.

Receiving Station Components—FIG. 5

The general organization of FIG. 5 is similar to FIG. 4, and the components of FIG. 5 will be described as they appear in the sequence of operations to validate a signature. When a message with a signature is received, the message is compressed to sixty-four bits and loaded into register 52 from bus 56. The non-volatile storage (not shown) is accessed to fetch the previously stored count value of sender A and this count is loaded into register 50. The compressed encoding of the next validation table from the signature is loaded into register 54 from bus 55. The user loads the keys and validation table entries from the signature one by one into a register 83 from a bus 84 and the user then supplies a signal on line 58 to begin one step in the operation to validate a signature.

Circuit 71 receives the count from register 50 and the compressed encoding of the next validation pattern from register 54 and forms the Exclusive-OR function on a bus 88. Notice that the compressed encoding in register 54 of the receiver's apparatus in FIG. 5 is identical to the contents of this register in the apparatus of the sender for a particular message, $M_i$. Similarly, the contents of counter 50 at the receiver's location are incremented during a signature validation operation to have the same values as counter 50 in the preceding operations by the sender. (The contents of register 54 and the sequence of contents in register 50 are unique to a particular message).

Suppose that an operation to validate the signature of FIG. 8 has just begun and signature key $k_1$ has been loaded into register 83 and the 0 bit of the first bit position of the compressed encoding appears at the output of register 52. The circuit of FIG. 5 operates at time T1 to convert key $k_1$ to the corresponding validation table entry, $v_1$, and operates at time T2 to partially construct the compressed validation table, $CE(VT^1)$ from this validation table entry. At time T1, a gate 86 cooperates with gate 61 to supply the signature key from register 83 to the key input 62 of cryptographic engine 63. A gate 89 is enabled to transmit the output of circuit 71 to the data input of the cryptographic engine and the validation table entry $v_1$ appears on bus 70. A set of gates 92, 93 is opened to transfer this validation table entry to temporary register 68 so that it will be available for a partial compression operation at time T2.

At time T2 of this example, there is an operation to construct the compressed encoding of the validation table. A temporary storage register 90 is initially set to all zeros or some other preselected value by a command from the user on a line 91. At time T2, gates 94 and 66 cooperate to transfer the contents of register 90 to the data input of cryptographic engine 63, and gates 97 and 61 cooperate to transfer the previously formed validation table entry in temporary register 68 to the key input 62 of the cryptographic engine. This operation produces at the output bus 70 the compressed encoding of the previously formed validation table entry $v_1$ and the intial contents of register 90. This new value is loaded into register 90 in place of the previous contents.

At the end of time T2, the user loads register 83 with the next sixty-four bit block from the signature, in this example the validation table entry $V_1$. At this time, counter 50 is also incremented as has been described for the components of FIG. 4. In response to the control signals T3 AND R=0, a gate 95 is opened to transfer validation table entry $V_1$ to the temporary register 68 so that it will be available for compression at time T4. At time T4, the validation table entry in register 68 is compressed with the contents of temporary register 90 in the way already described and as shown by legends in FIG. 5, and the new partial compressed encoding is stored in the temporary register 90.

This operation is continued for each of the sixty-four bit keys and validation table entries in the signature until the entire validation table has been formed and the compressed encoding of the validation table is held in register 90. If the message is valid and no errors have occurred, the contents of register 90 should equal the compressed encoding of the validation table, $CE(VT^i)$ which is held in a register 98. A compare circuit 99 compares the contents of registers 90 and 98 and produces a signal designated VALID on a line 102. The user accepts the message as authentic in response to this signal. If the complement signal, NOT VALID, appears on line 102, the user rejects the message. In response to to a VALID compare, a gate 103 transfers the compressed encoding of the next message, $CE(VT^{i+1})$ from register 54 to register 98 so that this value is available for the next signature validating operation. Equivalently, the contents of register 54 can be transferred to the general storage area within enclosure 48 at the end of the operation and then loaded into register 98 or otherwise made available for the compare operation when the next message from sender A is received. A suitable timing signal is supplied by the user on a line 106 to enable the compare operation. In the specific circuit of the drawing, an AND gate 107 responds to the signal on line 106 to enable the signal on line 102. Equivalently, the signal COMPARE on line 106 can be formed by a counter circuit within enclosure 48.

Figure 6:
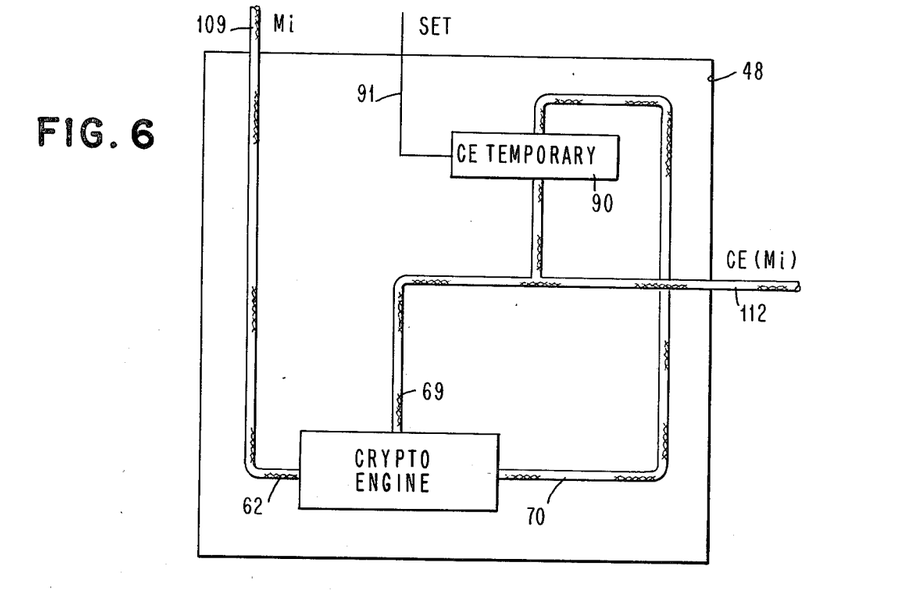
FIG. 6 is a diagram of the signature machine showing only the components that operate to form a validation table or signature table.

The Message Compression Operation—FIG. 6

The validation table compression technique that has been described for the components of FIG. 5 can also be used for forming the compressed encoding of the message. FIG. 6 shows the components of the signature machine that are controlled for this function. If the cryptographic engine operates on only fifty-six bits of a key and strips off eight parity or padding bits, the message is first blocked into fifty-six bit units by the user, and blocks of fifty-six bits (or blocks padded to sixty-four bits) are supplied on a bus 109 to the key input 62 of the cryptographic engine 63; and the contents of register 90 are supplied to the data input 69. The partial compressed message on bus 70 is then loaded into the temporary compressed encoding register 90. The output of register 90 is available to the user on a bus 112.

The data buses of FIG. 6 are suitably combined with the identical buses of FIGS. 4 and 5 by means of gates as illustrated in FIGS. 4 and 5. The various functions of the signature machine that are shown in FIGS. 4, 5 and 6 can be established by means of control lines supplied by the user to the gates. For example a signal FORM SIGNATURE to gates 65 and 72, VALIDATE SIGNATURE to gates 89 and 94 and COMPRESS DATA to gate 94 may be supplied by the user as an AND logic function of the associated timing and logic signals. This example illustrates that gates such as 65 in FIG. 4 and 89 in FIG. 5 may be the same gates with a suitable input in this example (FORM SIGNATURE and (T1 or T3)) or (VALIDATE SIGNATURE and ((T1 AND R=$\phi$) or (T3 AND R=1))).

Protocol

The protocol that permits the sender and the receiver to verify a signature and the associated message if a dispute arises has been referred to earlier in this description. One of the advantages of the method and apparatus of this invention is that the validation tables and previously used signature keys are constructed by a procedure called "backchaining".

Backchaining permits the receiver to validate a message, the message's signature, and the compressed encoding of the next validation table, all at a single time. It is not necessary for the receiver to store the validation tables. The tables can be verified from only the compressed encoding of the first validation table, since this compressed encoding is a cryptographic function of every entry signature key and every validation table entry to be used in the protocol. Hence, it is not necessary for the receiver to store the validation tables ahead of time. Only the compressed encoding of the first validation table must be stored by the receiver prior to commencement of the protocol.

In a conventional approach (no backchaining), the compressed encoding of the next validation table could be appended to (or made part of) the transmitted message, and thus validated by the signature. This would also eliminate the requirement for the receiver to store validation tables (or the compressed encodings of the validation tables) ahead of time. However, this approach has the disadvantage that the receiver may at a later time be required to demonstrate the validity of a succession of messages in order to demonstrate the validity of only a single validation table and hence the signature that it in turn validates.

The sender can reconstruct the signature keys and validation tables for a block of messages from the master key and the number of messages in the block in the way that has already been described. It is not necessary for the sender to save the actual tables.

It is possible to base the signature on groups of several bits in the compressed encoding of the message. For example, if groups of 2 bits were used in the compressed encoding of the message, then the signature key table would have 32 rows and 4 columns, and so forth.

From the description of a specific embodiment of the signature machine of this invention and the examples of its use, those skilled in the art will recognize a variety of implementations of the apparatus and variations in the operation within the spirit of the invention and the scope of the claims.

We claim:

1. Digital signature apparatus comprising, a cryptographic engine having an input for a key, an input for a data word to be enciphered, and an output for enciphered data, and means for selectively supplying a master key to the engine, means cooperating with said engine for forming a sequence of signature key tables by enciphering selected data under the master key, a signature key table having a zero signature key and a one key for each bit of a compressed encoding of predetermined length of a message for which a signature is to be formed, means cooperating with said engine for forming a last validation table for a last of the signature key tables in the sequence by encoding selected data under each of the signature keys of the last signature key table, the last validation table having an entry for each signature key of the corresponding signature key table, means for cryptographically forming a compressed encoding of the last validation table, the compressed encoding having the length of the data input of said engine, and for forming a validation table for each other signature key table by enciphering a function of the compressed encoding of the next validation table in the sequence under the keys of a signature key table, whereby the compressed encoding of the first validation table is a cryptographic function of each signature key table and each validation table.

2. The digital signature apparatus of claim 1 wherein said means for forming a sequence of signature key tables includes means for enciphering data values formed in a predetermined sequence, for example in a counting sequence.

3. The digital signature apparatus of claim 1 including means for transmitting to a receiver as part of a signature selected ones of the keys according to the compressed encoding of an associated message and for transmitting to the receiver the validation table entries corresponding to the untransmitted signature keys, and means for transmitting to the receiver as part of the signature the compressed encoding of the validation table for the next message, whereby the signature contains information for reconstructing the validation table associated with the signature.

4. The digital signature apparatus of claim 3 including, means responsive to a received message and associated signature for cooperating with the cryptographic engine for enciphering a function of the compressed encoding of the next validation table under each of the signature keys to form corresponding entries in the associated validation table and for compressing the validation table entries thus formed with the validation table entries in the received signature and for comparing the thus formed compressed validation table with a compressed validation table previously transmitted from the sender to the receiver to authenticate the signature.

5. The digital signature apparatus of claim 4 wherein said means responsive to a received message and associated signature includes means for compressing the message to the predetermined length and for identifying validation table entries and signature keys with respect to positions in the validation table according to the bit sequence of the compressed encoding of the message.

6. A method for forming a digital signature in a sequence of digital signatures, comprising, compressing a message to a predetermined length, selecting signature keys from a signature key table to code the compressed message, forming a validation table by encoding a function of the compressed encoding of the next validation table in the sequence under each of the signature keys of the signature key table, and transmitting as the signature the selected signature keys, the entries of the validation table for the unselected keys, and the compressed encoding of the next validation table.

* * * * *